(12) United States Patent
Issa et al.

(10) Patent No.: US 8,296,152 B2
(45) Date of Patent: Oct. 23, 2012

(54) SYSTEM AND METHOD FOR AUTOMATIC DISTRIBUTION OF CONVERSATION TOPICS

(75) Inventors: Alfredo C. Issa, Apex, NC (US);
Richard J. Walsh, Raleigh, NC (US)

(73) Assignee: Oto Technologies, LLC, Raleigh, NC (US)

( * ) Notice: Subject to any disclaimer, the term of this patent is extended or adjusted under 35 U.S.C. 154(b) by 0 days.

(21) Appl. No.: 13/053,868

(22) Filed: Mar. 22, 2011

(65) Prior Publication Data

US 2011/0200181 A1 Aug. 18, 2011

Related U.S. Application Data

(63) Continuation of application No. 12/705,854, filed on Feb. 15, 2010, now abandoned.

(51) Int. Cl.
*G10L 21/00* (2006.01)
*G10L 15/00* (2006.01)
*H04M 3/42* (2006.01)
*H04M 11/00* (2006.01)
*H04M 3/00* (2006.01)

(52) U.S. Cl. ........ 704/275; 704/231; 704/251; 704/270; 704/270.1; 379/201.01; 379/202.01; 379/93.21; 379/265.03; 379/88.01

(58) Field of Classification Search ................. 704/231, 704/251, 270, 270.1, 275; 379/201.01, 202.01, 379/93.21, 265.03
See application file for complete search history.

(56) References Cited

U.S. PATENT DOCUMENTS

| | | | |
|---|---|---|---|
| 5,596,634 A | 1/1997 | Fernandez et al. | |
| 6,151,571 A * | 11/2000 | Pertrushin | 704/209 |
| 6,997,993 B2 * | 2/2006 | Yamaguchi et al. | 118/728 |
| 7,155,207 B2 | 12/2006 | Chapman et al. | |
| 7,248,677 B2 * | 7/2007 | Randall et al. | 379/93.23 |
| 7,395,959 B2 | 7/2008 | Kirkland et al. | |
| 7,426,268 B2 | 9/2008 | Walker et al. | |
| 7,542,902 B2 | 6/2009 | Scahill et al. | |
| 7,653,191 B1 * | 1/2010 | Glasser et al. | 379/201.1 |
| 7,921,369 B2 * | 4/2011 | Bill | 715/753 |
| 8,036,361 B2 * | 10/2011 | Batni et al. | 379/210.01 |
| 2002/0003867 A1 * | 1/2002 | Rothschild et al. | 379/88.01 |
| 2002/0194002 A1 * | 12/2002 | Petrushin | 704/270 |
| 2006/0067497 A1 | 3/2006 | Erhart et al. | |
| 2007/0047726 A1 | 3/2007 | Jabbour et al. | |
| 2007/0071187 A1 | 3/2007 | Apreutesei et al. | |
| 2007/0116227 A1 | 5/2007 | Vitenson et al. | |

(Continued)

OTHER PUBLICATIONS

Lugano, G., "Mobile Social Networking in Theory and Practice," First Monday, Nov. 3, 2008, vol. 13, No. 11, http://firstmonday.org/htbin/cgiwrap/bin/ojs/index.php/fm/article/view/2232/2050, 13 pages.

(Continued)

*Primary Examiner* — Paras D Shah
(74) *Attorney, Agent, or Firm* — Withrow & Terranova, PLLC

(57) ABSTRACT

A method and system for distributing to a destination a notification of a topic being discussed by two participants of a voice call. Terms are extracted from an audio stream generated during the voice call. A topic is determined based on the extracted terms. A topic notification identifying the topic and at least one of the two participants is sent to a destination. A recipient of the notification may indicate a desire to join the voice call. Upon approval by one of the participants, the recipient may be joined to the voice call.

35 Claims, 6 Drawing Sheets

U.S. PATENT DOCUMENTS

| | | | |
|---|---|---|---|
| 2007/0274492 A1* | 11/2007 | Baker et al. | 379/202.01 |
| 2008/0114737 A1 | 5/2008 | Neely et al. | |
| 2008/0189407 A1* | 8/2008 | Charlton et al. | 709/224 |
| 2008/0235018 A1 | 9/2008 | Eggen et al. | |
| 2008/0275701 A1 | 11/2008 | Wu et al. | |
| 2009/0029674 A1 | 1/2009 | Brezina et al. | |
| 2009/0112985 A1 | 4/2009 | Quinn et al. | |
| 2009/0164912 A1 | 6/2009 | Barber et al. | |
| 2009/0203389 A1* | 8/2009 | Bhat | 455/466 |
| 2009/0225971 A1 | 9/2009 | Miller et al. | |
| 2010/0169435 A1* | 7/2010 | O'Sullivan et al. | 709/206 |
| 2010/0205541 A1 | 8/2010 | Rapaport et al. | |
| 2010/0280835 A1 | 11/2010 | Issa et al. | |
| 2011/0142221 A1* | 6/2011 | Tofighbakhsh et al. | 379/202.01 |

OTHER PUBLICATIONS

Non-Final Rejection mailed May 25, 2010, for U.S. Appl. No. 12/705,854.

Non-Final Rejection mailed Aug. 6, 2010, for U.S. Appl. No. 12/705,854.

Final Rejection mailed Oct. 5, 2010, for U.S. Appl. No. 12/705,854.

Non-final Office Action for U.S. Appl. No. 12/644,246 mailed Apr. 3, 2012, 13 pages.

* cited by examiner

SYSTEM AND METHOD FOR AUTOMATIC DISTRIBUTION OF CONVERSATION TOPICS

CROSS-REFERENCE TO RELATED APPLICATION

The present application is a continuation of U.S. patent application Ser. No. 12/705,854, filed Feb. 15, 2010, entitled "SYSTEM AND METHOD FOR AUTOMATIC DISTRIBUTION OF CONVERSATION TOPICS," which is hereby incorporated herein by reference in its entirety.

FIELD OF THE INVENTION

The present invention relates generally to social networking, and in particular to automatically determining a topic in a conversation, and distributing notification of the topic to a destination.

BACKGROUND OF THE INVENTION

People are interested in providing summaries of their daily activities, thoughts and experiences to colleagues, family, and friends. Web sites, such as MySpace™ and Facebook enable people to easily fulfill this desire, and have proven to be extremely popular. Often, recipients of these summaries share similar interests with the individual providing the summary. In some instances, had the recipient been timely notified that the individual was engaged in a particular activity or was discussing a particular topic with another individual, the recipient may have sought to join the activity or discussion. However, it may be impractical or impossible for an individual, in a timely manner, to continually keep colleagues and friends aware of what the individual is engaged in, or what they are discussing with others.

Keeping friends timely notified of topics being discussed in a telephone conversation is particularly challenging. It is impractical, and potentially dangerous, for a participant of a telephone conversation to simultaneously email or text other individuals regarding the topics being discussed during the conversation. Moreover, from a logistical standpoint, it may be impossible to concurrently send and receive text messages while engaging in a voice call. Yet, it is quite common that a group of friends share a common interest, and a call between two members of the group may have been enjoyed by multiple members of the group had each of the friends been aware of the conversation while it was occurring. Thus, it would be beneficial if an individual could automatically distribute notifications of topics being discussed during a telephone conversation to desired destinations.

SUMMARY OF THE INVENTION

The present invention identifies a topic being discussed by participants during a voice call, and distributes a notification of the topic to one or more destinations. A recipient of the notification may be provided an opportunity to join the voice call with the approval of one or both of the participants.

A first participant initiates a voice call with a second participant. As the first participant speaks, a communications device used by the first participant generates an audio stream containing voice signals of the first participant. The communications device sends the audio stream toward the communications device used by the second participant. A topic identification module receives the audio stream. The audio stream is converted to a text stream, and terms are extracted from the text stream. A topic is determined based on one or more of the terms detected in the text stream. The topic identification module sends the topic to a topic distribution module. The topic distribution module distributes a topic notification identifying at least one of the participants, and the topic, to one or more destinations.

The topic notification may include an invitation to join the voice call. If a recipient of the topic notification accepts the invitation, an authorization request identifying the recipient may be sent to one or both of the participants. If the authorization request is granted, a communication session may be initiated with the recipient, and the recipient may be joined to the voice call.

Multiple topic notifications may be distributed during a voice call. The topic identification module may determine topics on a continual basis, or at desired time intervals during the voice call. The topic identification module may maintain a list of distributed topics so that multiple topic notifications regarding the same topic are not distributed.

The topic identification module and topic distribution module may be located in one or both of the communications devices used by the first and second participants, or in a network element in the path of the audio streams. In one embodiment, the topic identification module may be located in one or both of the communications devices, and the topic distribution module may be located in a network element. A semantic analysis of the terms may be performed to determine a topic. For example, an ontology may be used by the topic identification module to determine a topic.

Either or both participants may have a topic filter that includes topic criteria that identifies whether a determined topic is suitable for distribution. The topic filter may include an approved topics list identifying topics suitable for distribution and/or a disapproved topics list identifying topics unsuitable for distribution. The topic filter may also include an approved conversation participant list identifying conversation participants with whom topic notifications may be distributed, and/or a disapproved conversation participant list identifying conversation participants with whom topic notifications may not be distributed. The topic filter may further include location criteria including an approved location list identifying potential locations of a conversation from which topic notifications may be distributed, and/or a disapproved location list identifying potential locations of a conversation from which topic notifications may not be distributed. The topic filter may further include time criteria including an approved time list identifying times of conversations during which topic notifications may be distributed, and/or a disapproved time list identifying times of conversations during which topic notifications may not be distributed.

One or both participants may receive a topic authorization request that must be granted prior to distributing a topic notification. A participant maintains a destination distribution list identifying destinations to which topic notifications should be distributed. A destination may include a web site, a computer, a mobile phone, a social network service such as MySpace™ and Facebook, and the like. A participant may have a distribution filter that further restricts distribution of topics based on identified distribution criteria. For example, the distribution criteria may include a topic destination list identifying that only certain topics may be distributed to certain destinations. A topic notification may be distributed in a variety of different formats suitable for the identified destination, such as a web site posting, an SMS text message, an email, and the like.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention identifies a topic being discussed by participants during a voice call, and distributes a notification of the topic to one or more destinations. A recipient of the notification may be provided an opportunity to join the voice call with the approval of one or both of the participants.

Figure 1:
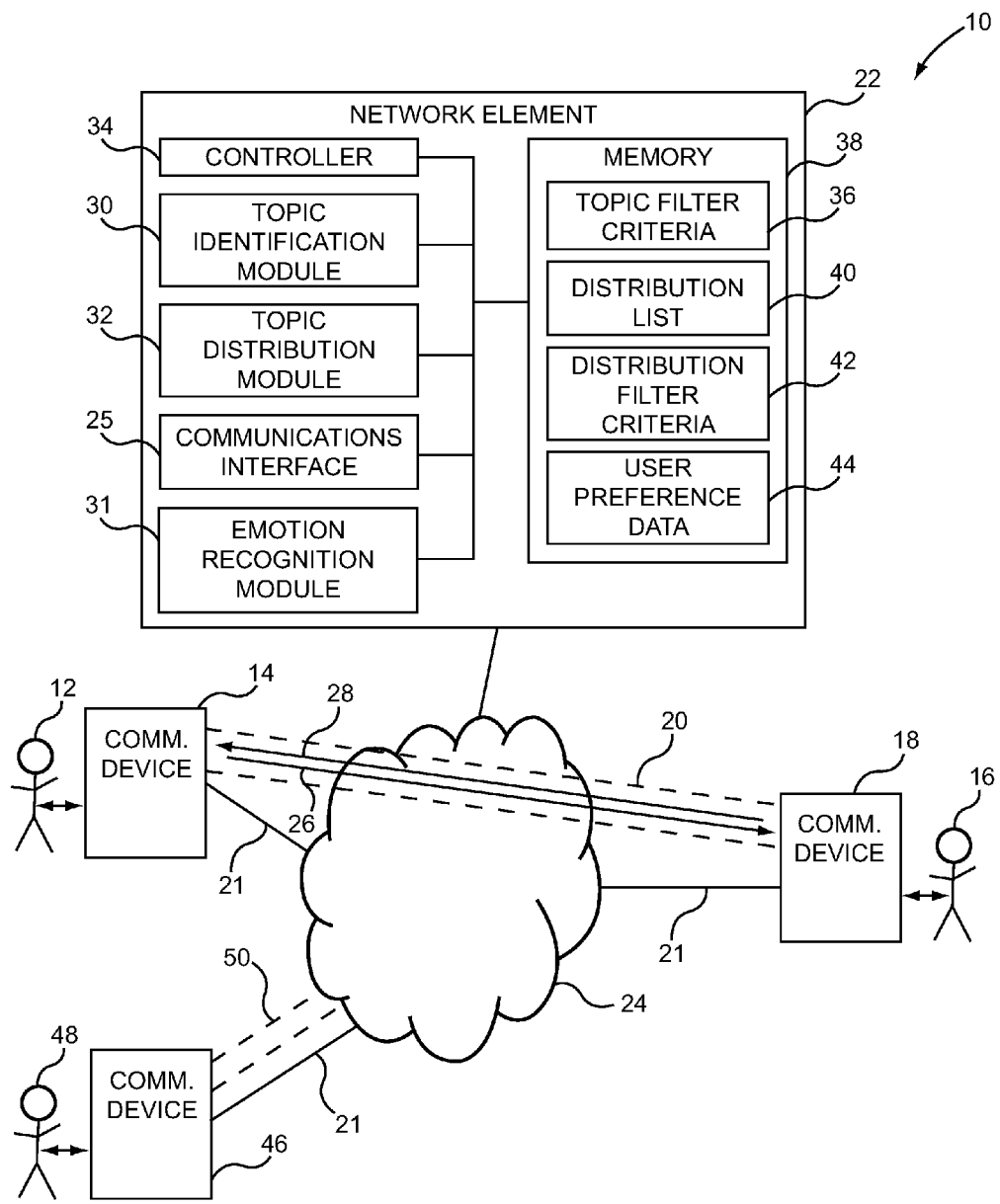
FIG. 1 is a block diagram of a system illustrating aspects of the present invention.

FIG. 1 illustrates a system 10 suitable for practicing aspects of the present invention. The system 10 includes a first participant 12 who uses a first communications device 14 to engage in a voice call with a second participant 16 using a second communications device 18. The phrase "voice call" is intended to encompass a real-time communication session of a finite duration between at least two individuals, such as a telephone call, a voice over internet protocol (VoIP) call, and the like. The first communications device 14 and the second communications device 18 can comprise any suitable processing device capable of engaging in voice calls, including, for example, a PDA, a mobile phone such as a cellular phone, a laptop computer, a desktop computer and the like. Preferably, at least one of the first communications device 14 and the second communications device 18 is a mobile communications device.

The first communications device 14 establishes a communication session 20 with the second communications device 18 via a communications medium 21. The communications medium 21 may comprise a wired or wireless medium such as WiFi, cellular technology, Ethernet, and the like, and may depend on a type of communications device 18. The communication session 20 may be established using any suitable protocol or protocols, including, for example, Session Initiation Protocol, MGC, standard cellular and PSTN signaling mechanisms, and the like. The communications session 20 is typically facilitated by one or more network elements 22 that reside in a network 24. The network element 22 can comprise a server, a switch, or any other communications device in the path, or otherwise coupled to, the communications session 20.

A first audio stream 26 comprising voice signals is generated by the first communications device 14 in response to words spoken by the first participant 12. The first audio stream 26 is provided to the communications session 20 for delivery to the second communications device 18. Similarly, a second audio stream 28 comprising voice signals is generated by the second communications device 18 in response to words spoken by the second participant 16. The first audio stream 26 and second audio stream 28 may comprise analog or digital signals. The network element 22 receives the first audio stream 26 and the second audio stream 28 via a communications interface 25. The network element 22 includes a topic identification module 30 and a topic distribution module 32, each of which is coupled to a controller 34. The controller 34 may include a central processing unit and memory (not shown) for storing instructions suitable for implementing the functionality described herein. The topic identification module 30 detects one or more terms in the voice signals in one or both of the audio streams 26, 28. Terms include words spoken by either or both of the first and the second participants 12, 16. Based on the detected terms, the topic identification module 30 identifies a topic being discussed by the first participant 12 and the second participant 16. The topic may be filtered based on topic filter criteria 36 contained in a memory 38, such as a random access memory, a flash memory, a hard disk drive, and the like. A topic can comprise words describing the subject matter of the discussion based on the detected terms. For example, a topic may comprise "Star Trek movie," "Lamborghini automobiles," "skiing," and the like.

The network element 22 can also include an emotion recognition module 31 which can analyze one or both of the audio streams 26, 28 to detect and identify an emotional state of one or both of the first and second participants 12, 16. The emotion recognition module 31 may identify the detected emotion via an emotion identifier, which may be used for topic filtering purposes, or topic notification purposes, as described in greater detail herein.

The topic identification module 30 sends the topic to the topic distribution module 32. The topic distribution module 32 obtains a distribution list 40 from the memory 38, identifying potential destinations to which a topic notification may be distributed. The potential destinations may be filtered based on a distribution filter criteria 42. User preferences maintained in the memory 38, such as in the topic filter criteria 36, the distribution filter criteria 42, or user preference data 44, may identify various additional options regarding times, locations and the like that may affect if and when a topic notification is distributed.

The topic distribution module 32 distributes a topic notification to a destination, such as a third communications device 46. A recipient 48 views the topic notification on the third communications device 46. The topic notification may include an invitation for the recipient 48 to join, or participate, in the voice call. The invitation can comprise, for example, a user actuatable link that, when actuated, indicates to the network element 22 that the recipient 48 would like to join the voice call. The network element 22 may seek approval from one or both of the first and the second participants 12, 16. Assuming approval is granted, the network element 22 may initiate a communication session 50 with the third communications device 46. The network element 22 may then join the communication session 50 with the communication session 20, and the first and the second participants 12, 16 and the recipient 48 may converse with one another.

Figure 2:
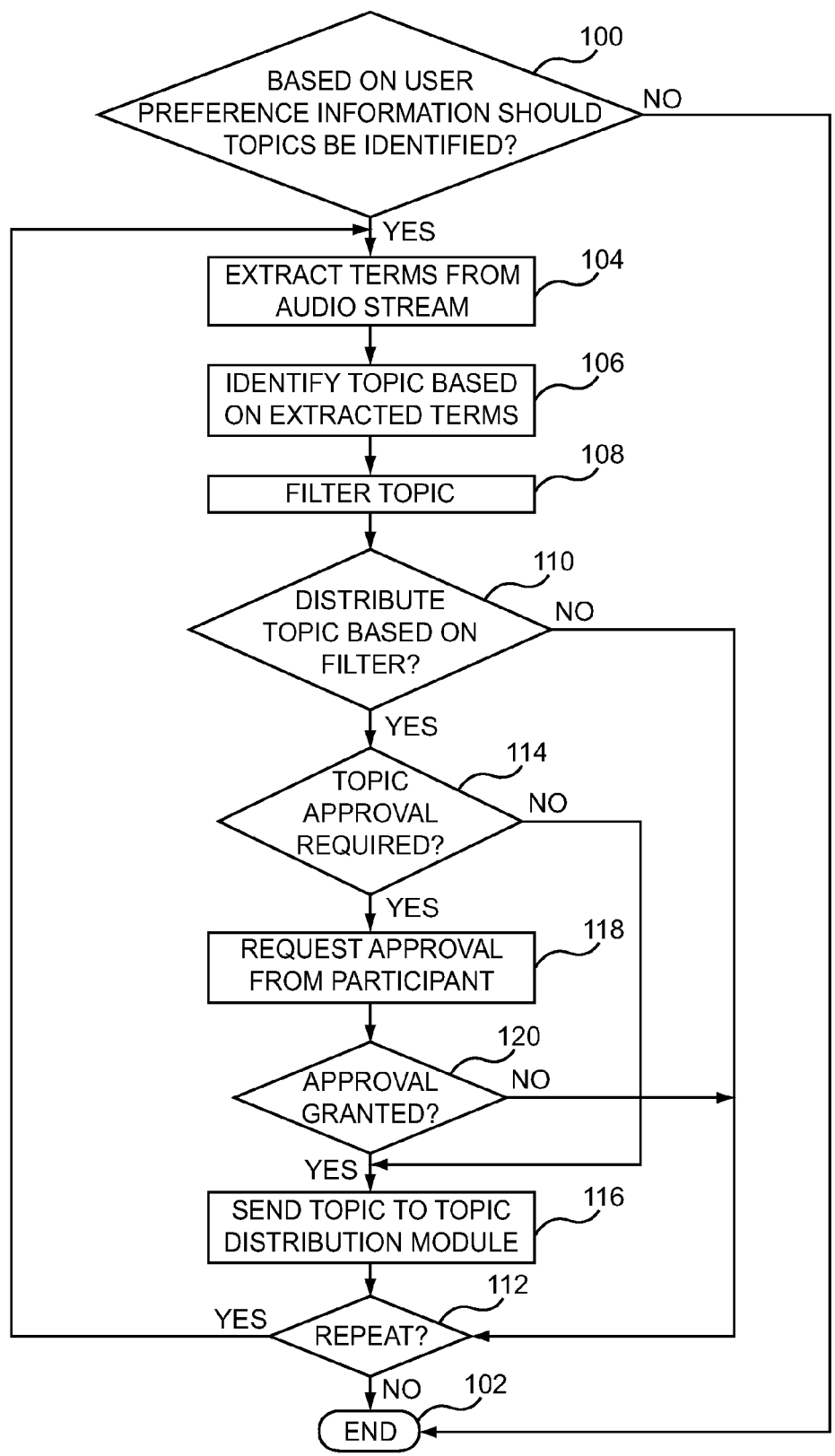
FIG. 2 is a flowchart illustrating a method for determining topics according to one embodiment of the invention.

FIG. 2 is a flowchart illustrating a method for determining topics according to one embodiment of the invention. FIG. 2 will be discussed in conjunction with FIG. 1. For purposes of illustration, it will be assumed that the first participant 12 is a subscriber to a topic distribution service that implements aspects of the present invention. Thus, the discussion herein will primarily focus on the topic identification module 30 with respect to the first audio stream 26 generated by the first communications device 14 in response to voice signals of the first participant 12. However, in practice, the second participant 16 may also be a subscriber to such a service, or otherwise have a topic identification module 30 that identifies topics from the second audio stream 28. Where both of the first and the second participants 12, 16 of a voice call may desire to have topic notifications distributed, the first and the second participants 12, 16 may decide that topic notifications may be distributed without approval of either party, only with approval of one party, or only with approval of both parties. Such options may be configured by the first and the second participants 12, 16 upon mutual agreement at the beginning of the voice call, or may be preconfigured and stored in the memory 38. For example, the first participant 12 may have a configuration option that indicates the first participant 12 always desires to have topic notifications distributed. The second participant 16, on the other hand, may have a configuration option that indicates topic notifications should be distributed only between 5:00 PM and 8:00 AM. If the conversation between the first participant 12 and the second participant 16 occurs at 4:00 PM, the first participant 12 may receive a message generated by the network element 22 indicating topic notifications will not be distributed based on the configuration option of the second participant 16. Alternately, topics determined from the first audio stream 26 may be distributed based on the configuration option of the first participant 12, while no topic notification distribution will occur based on the second audio stream 28. It is apparent that such conflicts could be handled in a number of different ways as desired by the first and the second participants 12, 16, or by a service provider providing such a topic distribution service.

The topic identification module 30 initially obtains user preference information associated with the first participant 12 from one or more of the topic filter criteria 36, the distribution filter criteria 42 and the user preference data 44 in the memory 38 (step 100). The user preference information may include time criteria identifying times the first participant 12 desires topic notification distribution, or times the first participant 12 does not desire topic notification distribution. For example, the time criteria may indicate that topic notification distribution is not desired between 8:00 AM-5:00 PM Monday through Friday.

The user preference information may also include location criteria indicating locations from which the first participant 12 desires topic notification distribution, or locations from which the first participant 12 does not desire topic notification distribution. For example, the user preference information may indicate the first participant 12 does not desire topic notification distribution when the first participant 12 is at work. The location of the first participant 12 may be provided by the first participant 12 to the topic notification distribution service, or may be obtained by information provided by the communications device 14, such as from a GPS module in the communications device 14. The user preference information may also include participant criteria indicating that the first participant 12 desires topic notification distribution only when conversing with certain other participants, such as the second participant 16. The second participant 16 may be identified by, for example, caller identification information provided during setup of the communication session 20. If, based on any of the user preference information, the first participant 12 does not desire topic notification distribution, the topic identification module 30 terminates and does not determine topics (step 102).

If the first participant 12 desires topic notification distribution, the topic identification module 30 detects terms in the voice signals of the first audio stream 26 (step 104). Term detection may include, for example, converting the voice signals carried in the first audio stream 26 to a textual stream of words, and selecting words from the textual stream. A natural language processor may be used to identify the terms. Based on the detected terms, a topic is determined (106). A topic is one or more words that describe the subject matter of the voice call at a given point in time. Topic identification may be aided via semantic analysis, such as through the use of an ontology, for example. Topics may be identified based on terms detected in either the first audio stream 26, the second audio stream 28, or via a combination of terms detected in both the first audio stream 26 and the second audio stream 28.

Topic identification may also be aided via contextual information which may be available to the topic identification module 30, such as, for example, location information associated with the first participant 12. For example, a new Star Trek movie may be showing in movie theaters. The topic identification module 30 may detect words such as "Captain," "Kirk," and "Sulu," and, based on an ontology, conclude that the topic is "Star Trek." The topic identification module 30 may further determine that the location of the communications device 14 is adjacent or near a movie theater showing the new Star Trek movie. The location of the communications device 14 may be obtained from the service provider providing cellular service to the communications device 14, or via a location service to which the first participant 12 subscribes, or via other conventional means. Based on the proximity of the first participant 12 to the movie theater, the topic identification module 30 may conclude that the topic is "the new Star Trek movie" rather than merely "Star Trek."

The topic may be filtered based on one or more topic filter criteria 36 (step 108). The topic filter criteria 36 may comprise any information by which the first participant 12 may indicate whether a determined topic is suitable for distribution. For example, the topic filter criteria 36 may include an approved topics list which identifies topics approved for notification distribution by the first participant 12. Approved topics may include, for example, topics in which the first participant 12 knows his friends or colleagues have a mutual interest. An exemplary approved topics list is provided in Table 1.

TABLE 1

| |
|---|
| movies |
| Lamborghini automobiles |
| real estate |
| Sally |
| beagles |

Alternately or additionally, the topic filter criteria 36 may include a disapproved topics list which identifies topics disapproved for notification distribution by the first participant 12. An exemplary disapproved topics list is provided in Table 2.

TABLE 2 wife
boss
finances
Matt
EMOTION: crying
cooking/2

While for purposes of illustration Tables 1 and 2 are shown as having a relatively simple list of topics, any of the filter criteria described herein, such as the approved topics list or the disapproved topics list, may further delineate categories of topics, in addition to specific topics, to which the filter criteria may be applied. For example, the disapproved topics list may include an entry such as "cooking/2," indicating that the topic "cooking" should not be distributed, nor should any topic that is identified in the respective ontology as being within two levels of the topic "cooking." For example, an ontology may classify a topic "roasting" as being within two levels, or nodes, of the topic "cooking." The topic identification module may detect the topic "roasting," but based on the entry in the disapproved topics list of "cooking/2," determine that the topic "roasting" is a disapproved topic.

The network element 22 may also include the emotion recognition module 31 for detecting an emotional state that may be conveyed by the first participant 12 in the first audio stream 26. The emotion recognition module 31 may be integral with the topic identification module 30, or may be a separate module coupled to the topic identification module 30. The first audio stream 26 may be provided to the topic identification module 30 and the emotion recognition module 31 serially or in parallel. Detected topics and recognized emotions may have timestamps associated therewith for purposes of determining a current emotion for purposes of filtering and generating a topic notification.

The emotion recognition module 31 may recognize and identify an emotion conveyed by the first participant 12 in the first audio stream 26, such as "yelling," "laughing," "crying," and the like. The emotion recognition module 31 may generate an emotion identifier identifying the recognized emotion. Emotions may be used for filtering purposes and for topic notification purposes. For example, the disapproved topics list may include an entry such as "Emotion: crying" indicating that topics should not be distributed if a "crying" emotion has been detected. While the emotion criteria is illustrated for purposes of convenience in the disapproved topic list, those skilled in the art will recognize separate topic filter criteria tables may be used for approved/disapproved emotions.

The emotion identifier identifying a particular emotion such as "yelling," "laughing," and "crying" can be provided, along with the topic, to the topic distribution module 32. The topic distribution module 32 may use the emotion identifier to generate a topic notification that identifies the recognized emotion. For example, the topic distribution module 32 may generate a topic notification comprising "JOHN IS YELLING ABOUT THE NEW STAR TREK MOVIE TO SALLY."

If the determined topic is not suitable for distribution based on the topic filter criteria 36 (step 110), the process may end, or may resume detecting terms (step 112). The process described herein for determining topics and distributing topic notifications may be iterative, and repeated many times during the duration of the voice call. According to one embodiment, the process repeats on a continual basis after a predetermined period of time, for example every 10 seconds. Alternatively, the process operates on a buffered audio stream after a predetermined time frame of the audio stream has been buffered. For example, two buffers may exist in the memory 38, each capable of holding at least two minutes of the audio stream 26. After the first buffer is full, the topic identification module 30 may examine the audio stream in the first buffer to determine topics for notification distribution. During this time, the ongoing audio stream is then buffered in the second buffer. At the end of two minutes, the topic identification module 30 may examine the audio stream in the second buffer to determine topics for notification distribution. Alternatively, the process operates on a buffered audio stream after a predetermined amount of memory is used. For example, two buffers may exist in the memory 38 of a particular size, such as 2 MB. Upon the first buffer becoming full, the topic identification module 30 may examine the audio stream in the first buffer to determine topics for notification distribution. During this period of time, the audio stream is being buffered in the second buffer. Irrespective of the precise process used, the topic identification module 30 may maintain a table of topics for which topic notifications have been distributed to prevent repeatedly distributing topic notifications on the same topic during the duration of the call.

If the determined topic is suitable for distribution (step 110), then it may be determined whether topic approval by one or more of the first and the second participants 12, 16 is required (step 114). If not, then the topic may be provided to the topic distribution module 32 (step 116). If topic approval is required, the topic identification module 30 may initiate a topic authorization request message to the first participant 12 identifying the topic, and requesting approval to distribute a topic notification (step 118). The first participant 12 may be provided, for example, an SMS message with the determined topic. The first participant 12 may then reply to the message "yes" or "no" to indicate approval or to deny approval, respectively (step 120). Alternatively, the SMS message could include two actuatable links, one of which is actuated, or selected, by the first participant 12 to indicate approval and the second of which is selected to indicate disapproval. In another embodiment, a user interface may be displayed on the communications device 14 which includes selectable controls that enable the user to easily grant approval or deny the request. If the first participant 12 does not grant approval, the process may determine whether to end the topic notification distribution process, or to resume detecting terms (step 112). If the first participant 12 indicates approval to distribute a topic notification, the topic identification module 30 sends the topic to the topic distribution module 32 for distribution (step 116).

Figure 3:
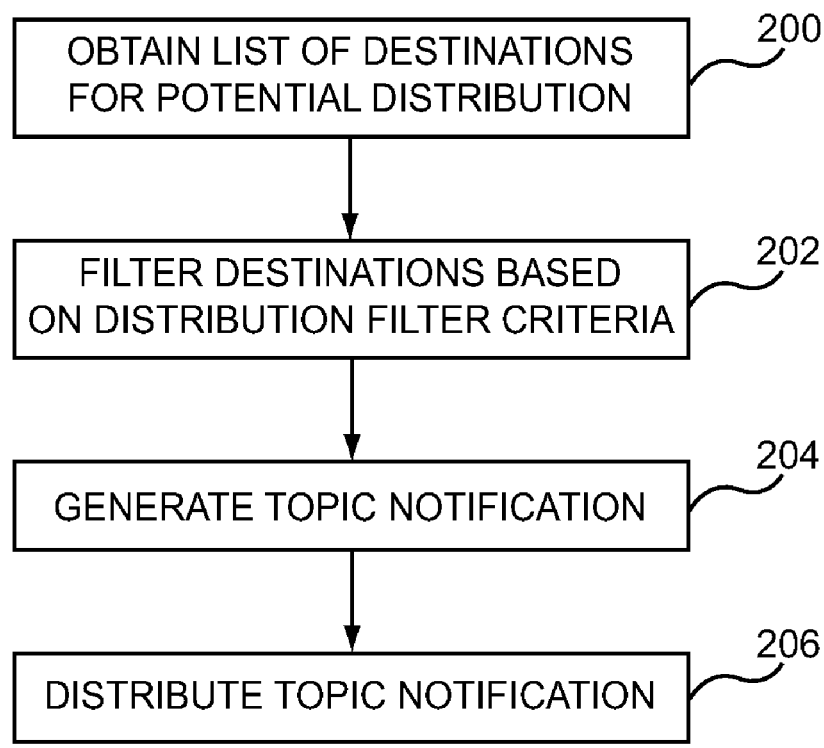
FIG. 3 is a flowchart illustrating a method for distributing a topic notification according to one embodiment of the invention.

FIG. 3 is a flowchart illustrating a method for distributing a topic notification according to one embodiment of the present invention. The topic distribution module 32 may initially obtain the distribution list 40 from the memory 38 identifying potential destinations to which the topic may be distributed (step 200). The potential destinations may include one or more of a web site, an email address, a telephone, or any other addressable destinations to which a topic notification can be distributed. An exemplary distribution list 40 is illustrated in Table 3.

TABLE 3

9195551212
www.righefd.com/post.html
djohnsont@wert.com
2075551212

The distribution list 40 may be filtered based on distribution filter criteria 42 (step 202). The distribution filter criteria 42 may indicate that only certain topics may be distributed to certain destinations. For example, the distribution filter criteria 42 may indicate that any topic may be posted to the www.righefd.com/post.html destination, but only "beagles" and "real estate" topics may be distributed to the "9195551212" destination. The distribution filter criteria 42 may also indicate that only certain topics may be sent to destinations that are, at the time of topic identification, at certain locations. For example, the distribution filter criteria 42 may indicate that a topic notification for the topic "beagles" may be sent to the "9195551212" destination only when the "9195551212" destination is at "home." The location of the "9195551212" destination may be obtained by conventional mechanisms, such as, for example, information provided by a service provider that provides service to the device, or a location service to which the device is registered. A table may be maintained that cross-references location information provided by the service provider or location service with identified locations, such as "home."

The topic distribution module 32 may then generate the topic notification (step 204). The topic notification identifies the determined topic, and at least one of the first participant 12 and the second participant 16. The topic distribution module 32 then distributes the topic notification to one or more destinations based on the distribution filter criteria 42 (206). The form of the topic notification may differ depending on the destination. The topic notification may take the form of a posting where the destination is a web site, and an SMS message where the destination is a telephone number, for example. The topic notification may be an email where the destination is an email address.

Figure 4:
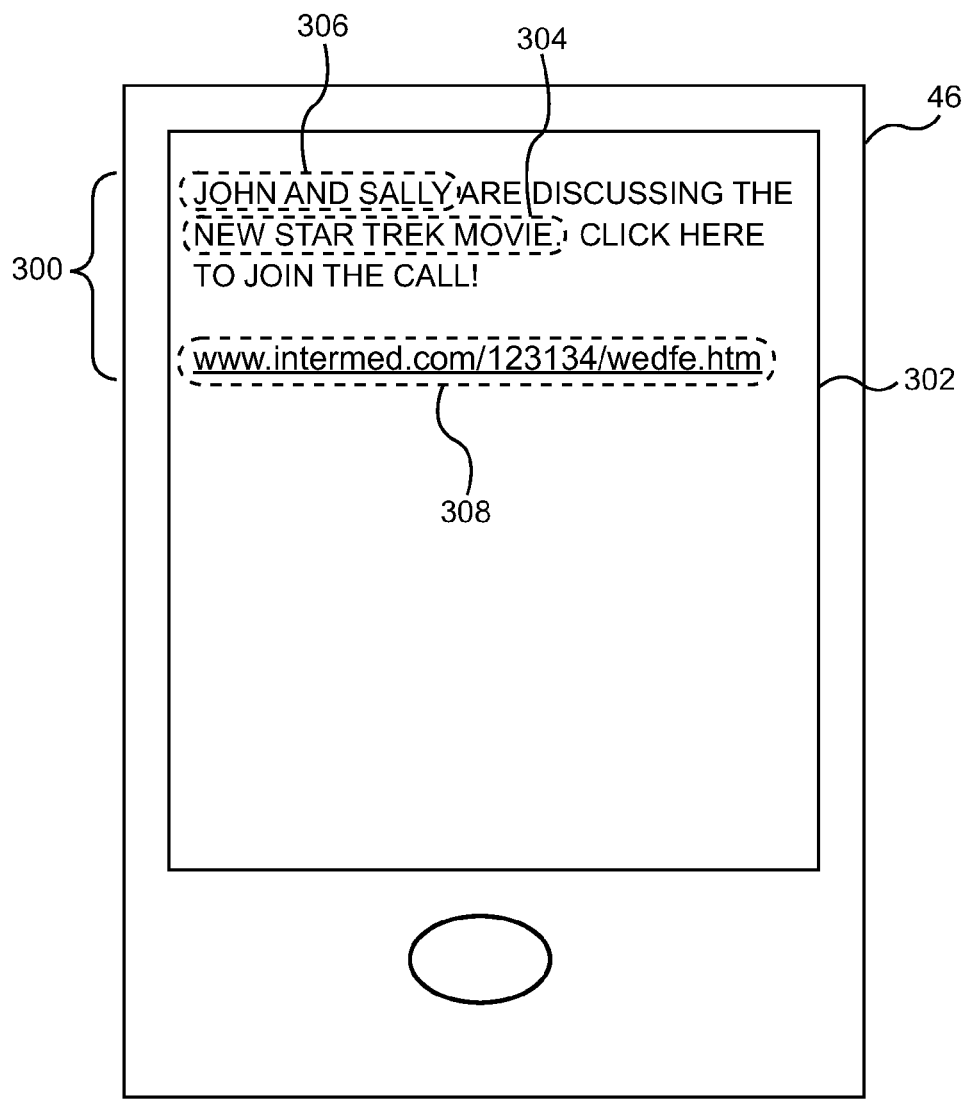
FIG. 4 is a block diagram illustrating an exemplary topic notification.

FIG. 4 is a block diagram illustrating an exemplary topic notification and distribution. FIG. 4 will be discussed in conjunction with FIG. 1. A topic notification 300 is received by the third communications device 46, such as a mobile phone. The third communications device 46 includes a display 302, wherein the topic notification 300 is displayed. The topic notification 300 may have been sent by SMS, for example, and therefore may comprise an SMS message. The topic notification 300 includes an identification of a topic 304, such as, for example, the "Star Trek movie." The topic notification 300 includes a participant identification 306, which, in this example, identifies "John" and "Sally" as the participants to the voice call. The topic notification 300 also includes a link 308 which, if selected or otherwise actuated by the recipient 48, indicates a desire by the recipient 48 to join the voice call between John and Sally. While for purposes of illustration the topic notification 300 is shown as an SMS message, those skilled in the art will recognize that the topic notification may comprise any desired format, and may include media in addition to text. For example, the topic notification may comprise a multimedia messaging service (MMS) message that includes an image, such as an icon, relating to the determined topic.

Figure 5:
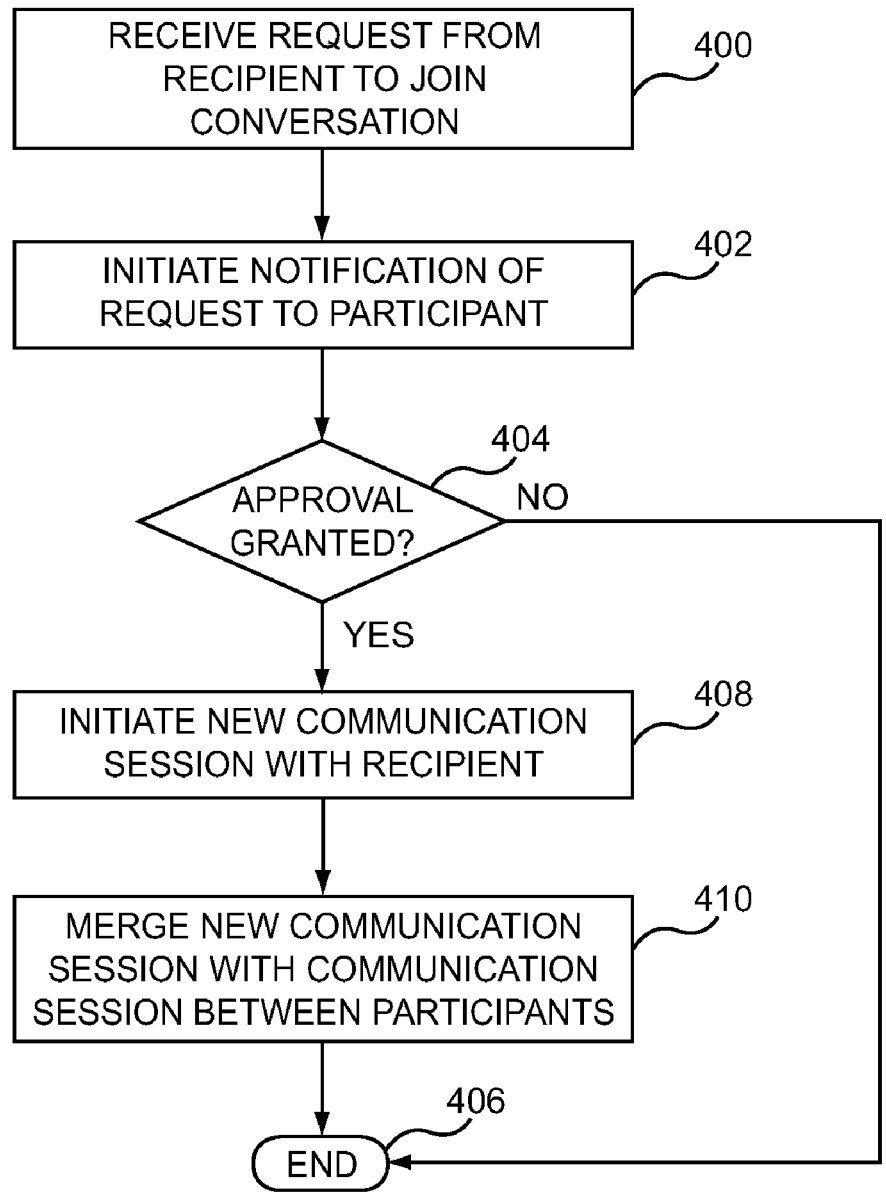
FIG. 5 is a flowchart illustrating a method for joining a recipient to a voice call based on a topic notification according to one embodiment of the invention.

FIG. 5 is a flowchart illustrating a method for joining a recipient to a voice call based on a topic notification according to one embodiment of the present invention. FIG. 5 will be discussed in conjunction with FIGS. 1 and 4. After receiving the topic notification 300, the recipient 48 indicates a desire to join the voice call between the first participant 12 and the second participant 16 (step 400). The recipient 48 may indicate a desire to join, for example, by selecting the link 308 that is included in the topic notification 300. The selection of the link 308 may indicate to the network element 22, or any other suitable network element, that the recipient 48 wishes to join the voice call. The selection of the link 308 may identify both the voice call that the recipient 48 wishes to join, as well as the address, such as the telephone number, of the third communications device 46. For example, referring again to FIG. 4, the link 308 may include metadata identifying the voice call between the first participant 12 and the second participant 16, as well as the phone number of the third communications device 46. Selection of the link 308 by the recipient 48 may then cause a request including the metadata to be provided to the network element 22.

Upon receipt of the request, the network element 22 may initiate a notification of the request to the first participant 12 (step 404). The notification may include a mechanism by which the first participant 12 can easily approve or disapprove of the request. For example, the notification may include two links, one of which if selected by the first participant 12 indicates an approval for the recipient 48 to join the voice call, and the second of which may indicate a disapproval for the recipient 48 to join the voice call. Assuming the first participant 12 indicates an approval to allow the recipient 48 to join the voice call, the network element 22 may initiate a communication session 50 with the third communications device 46 (408). Once the communication session 50 is established, the network element 22 may then merge the communication session 50 with the communication session 20 to enable the first participant 12, the second participant 16 and the recipient 48 to converse with each other (step 410).

While the topic identification module 30 and the topic distribution module 32 have been described herein as being in the network element 22, the topic identification module 30 may be in one or both of the communications devices 14, 18. Similarly, the topic distribution module 32 could also be in one or both of the communications devices 14, 18. In one embodiment, the topic identification module 30 is located in one or both of the communications devices 14, 18, and the topic distribution module 32 is located in the network element 22. Thus, elements of the present invention may be distributed, as desired, between communications devices and network elements. Moreover, while the functionality associated with aspects of the present invention have been, for purposes of illustration, described as being provided in multiple modules, such as the topic identification module 30 and the topic distribution module 32, such functionality could be provided in a single module, or in more than two modules, as desired.

The invention has been described herein in the context of an ongoing voice call. However, the invention may be implemented even shortly after the termination of a voice call, or during the session termination process terminating the voice call. For example, all or a portion of the audio streams 26, 28 may be buffered in a memory, and the topic identification module 30 may detect terms from the buffered audio streams 26, 28 and determine a topic even as the voice call is terminated, or shortly thereafter. Other aspects of the invention would operate as described herein, except in such embodiment, a recipient will not be provided an opportunity to join the call.

Figure 6:
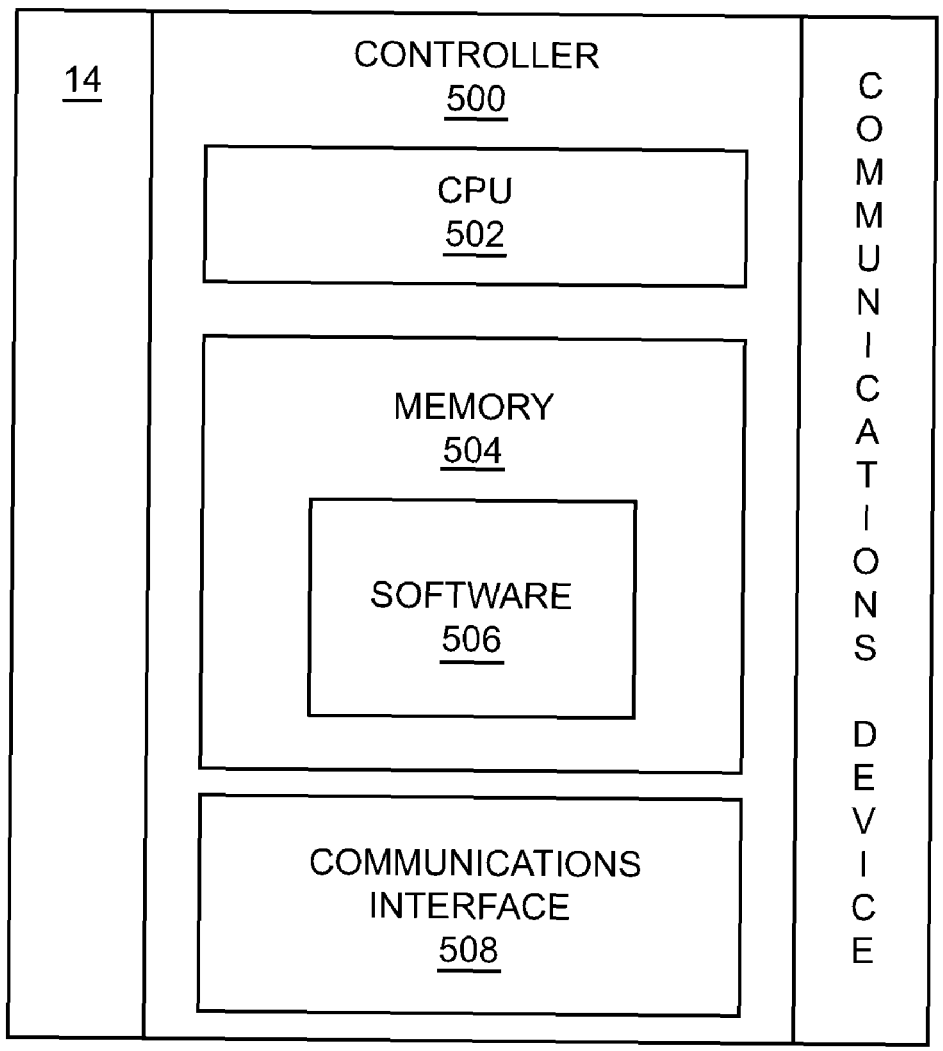
FIG. 6 is a block diagram of a communications device according to one embodiment of the invention.

FIG. 6 is a block diagram of the communications device 14 according to one embodiment of the invention. The communications device 14 includes a controller 500 that includes a central processing unit (CPU) 502 and a memory 504, such as a random access memory, that may contain software instructions 506 suitable for providing the functionality described herein for determining topics and distributing notifications of the topics. The communications device 14 may also include a communications interface 508 adapted to interface with the network 24.

Various aspects of the present invention may be embodied in instructions that are stored in hardware, and may reside, for example, on a computer program product such as a flash memory, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable or computer usable storage medium known in the art. An exemplary storage medium is coupled to the processor such that the processor can read information from, and write information to, the storage medium. In the alternative, the storage medium may be integral to the processor. The processor and the storage medium may reside in an ASIC.

Those skilled in the art will recognize improvements and modifications to the preferred embodiments of the present invention. All such improvements and modifications are considered within the scope of the concepts disclosed herein and the claims that follow.

What is claimed is:

1. A method for distributing a topic notification, comprising:
   receiving, by a processing device, a first audio stream comprising voice signals generated by a first participant in a voice call speaking with a second participant during a duration of the voice call;
   detecting, by the processing device, at least one term in the voice signals;
   determining, by the processing device, at least one topic based on the at least one term;
   processing the first audio stream to identify an emotion of the first participant;
   accessing user preference data associated with the first participant, wherein the user reference data precludes to sic notification distribution if at least one particular emotion is identified based on the first audio stream;
   determining that the emotion is not the at least one particular emotion;
   distributing the topic notification including the at least one topic and an identification of at least one of the first participant and the second participant to a plurality of destinations in response to determining that the emotion is not the at least one particular emotion; and
   joining a recipient of the topic notification to the voice call in response to the topic notification.

2. The method of claim 1 wherein the topic notification comprises a textual notification.

3. The method of claim 1 wherein the at least one topic is an approved topic identified on an approved topics list, and further comprising detecting at least one second term in the voice signals, determining a second topic based on the at least one second term, determining that the second topic is a disapproved topic identified on a disapproved topics list, and not distributing a second topic notification of the second topic based on the determination that the second topic is a disapproved topic.

4. The method of claim 1 wherein a plurality of topic notifications is distributed during the duration of the voice call, and wherein each of the plurality of topic notifications is a topic notification about a different topic from a topic included in any other topic notifications distributed during the duration of the voice call.

5. The method of claim 4 wherein a first of the plurality of topic notifications is distributed to a first destination of the plurality of destinations and not a second destination of the plurality of destinations, and a second of the plurality of topic notifications is distributed to the second destination and not the first destination.

6. The method of claim 1 wherein determining the at least one topic based on the at least one term further comprises determining the at least one topic based on an ontology.

7. The method of claim 1 further comprising receiving an approval to distribute the topic notification from at least one of the first participant and the second participant prior to distributing the topic notification, and wherein the topic notification is distributed to the plurality of destinations in response to determining that the emotion is not the at least one particular emotion and to the approval.

8. The method of claim 1 further comprising determining the plurality of destinations based on a distribution list associated with the first participant.

9. The method of claim 1 further comprising receiving an approval to allow the recipient of the topic notification to participate in the voice call from one of the first participant and the second participant before joining the recipient to the voice call.

10. The method of claim 1 wherein the topic notification further comprises an actuatable link, and wherein joining the recipient of the topic notification to the voice call is done in response to actuation of the actuatable link by the recipient.

11. The method of claim 1 further comprising receiving, by the processing device, a second audio stream comprising second voice signals generated by the second participant in the voice call and detecting at least one second term in the second voice signals; and wherein determining the at least one topic based on the at least one term further comprises determining the at least one topic based on the at least one term and the at least one second term.

12. The method of claim 1 further comprising accessing an approved topics list associated with the first participant, and wherein determining, by the processing device, the at least one topic based on the at least one term further comprises determining the at least one topic based on the at least one term and the approved topics list.

13. The method of claim 1 wherein the topic notification comprises the at least one topic, an identification of the first participant, and an identification of the second participant.

14. The method of claim 1 further comprising:
   accessing a distribution list associated with the first participant;
   accessing filter criteria associated with the first participant; and
   filtering the distribution list based on the filter criteria to determine the plurality of destinations.

15. The method of claim 1 further comprising:
   accessing the user preference data associated with the first participant, wherein the user preference data identifies a time frame during which the topic notification may be distributed;
   determining that the current time is within the time frame; and
   wherein distributing the topic notification including the at least one topic and the identification of the at least one of the first participant and the second participant to the plurality of destinations is in response to determining that the emotion is not the at least one particular emotion and determining that the current time is within the time frame.

16. The method of claim 1 further comprising:
   accessing the user preference data associated with the first participant, wherein the user preference data identifies a location;
   determining that a mobile communications device via which the first participant is participating in the voice call is at the location; and wherein distributing the topic notification including the at least one topic and the identification of the at least one of the first participant and the second participant to the plurality of destinations is in response to determining that the emotion is not the at least one particular emotion and determining that the mobile communications device is at the location.

17. The method of claim 1 wherein determining, by the processing device, the at least one topic based on the at least one term further comprises determining, by the processing device, at least one topic based on the at least one term and based on contextual information associated with a location of one of the first participant and the second participant.

18. The method of claim 17, wherein the contextual information comprises an identity of a movie being offered by a movie theater in proximity to the location.

19. The method of claim 1 wherein distributing the topic notification including the at least one topic and the identification of the at least one of the first participant and the second participant to the plurality of destinations further comprises distributing the topic notification including the at least one topic, the identification of the at least one of the first participant and the second participant, and an identification of the emotion to the plurality of destinations.

20. The method of claim 1 further comprising:
in response to determining the at least one topic, sending, by the processing device, a topic authorization request identifying the at least one topic to a communications device associated with the first participant;
subsequently receiving, by the processing device, an authorization to distribute the topic notification from the communications device; and
wherein distributing the topic notification including the at least one topic and the identification of the at least one of the first participant and the second participant to the plurality of destinations is in response to determining that the emotion is not the at least one particular emotion and receiving the authorization.

21. The method of claim 1 further comprising:
accessing the user preference data associated with the first participant, wherein the user preference data identifies a particular topic that may be distributed only to the plurality of destinations;
determining that the at least one topic is the particular topic; and
wherein the plurality of destinations is determined based on determining that the at least one topic is the particular topic.

22. The method of claim 1 further comprising:
accessing the user preference data associated with the first participant; and
wherein determining, by the processing device, the at least one topic based on the at least one term further comprises determining, by the processing device, the at least one topic based on the at least one term and the user preference data.

23. The method of claim 1 wherein the plurality of destinations comprises mobile communication devices associated with individuals other than the first participant and the second participant.

24. An apparatus, comprising:
a communications interface adapted to interface with a network;
a controller coupled to the communications interface and adapted to:
receive a first audio stream comprising voice signals generated by a first participant in a voice call during a duration of the voice call;
detect at least one term in the voice signals;
determine at least one topic based on the at least one term;
process the first audio stream to identify an emotion of the first participant;
access user preference data associated with the first participant, wherein the user preference data precludes topic notification distribution if at least one particular emotion is identified based on the first audio stream;
determine that the emotion of the first participant is not the at least one particular emotion;
distribute a topic notification including the at least one topic and an identification of at least one of the first participant and a second participant to a plurality of destinations in response to determining that the emotion of the first participant is not the at least one particular emotion; and
join a recipient of the topic notification to the voice call in response to the topic notification.

25. The apparatus of claim 24 wherein the apparatus comprises a mobile communications device.

26. The apparatus of claim 24 wherein the apparatus comprises a server.

27. The apparatus of claim 24 wherein the at least one topic is an approved topic identified on an approved topics list, and wherein the controller is further adapted to detect at least one second term from the voice signals, determine a second topic based on the at least one second term, determine that the second topic is a disapproved topic identified on a disapproved topics list, and not distribute a second notification of the second topic based on the determination that the second topic is a disapproved topic.

28. The apparatus of claim 24 wherein the controller is further adapted to iteratively determine a plurality of topics based on a first plurality of terms detected in the voice signals, and to distribute a plurality of topic notifications during the duration of the voice call, and wherein each of the plurality of topic notifications is a topic notification about a different topic from a topic included in any other topic notifications distributed during the duration of the voice call.

29. A computer program product, comprising a non-transitory computer usable storage medium having a computer readable program code embodied therein, said computer readable program code adapted to be executed to implement a method for distributing a topic notification, said method comprising:
receiving a first audio stream comprising voice signals generated by a first participant in a voice call with a second participant during a duration of the voice call;
detecting at least one term from the voice signals;
determining at least one topic based on the at least one term;
processing the first audio stream to identify an emotion of the first participant;
accessing user preference data associated with the first participant, wherein the user preference data precludes topic notification distribution if at least one particular emotion is identified based on the first audio stream;
determining that the emotion of the first participant is not the at least one particular emotion;
distributing the topic notification including the at least one topic and an identification of at least one of the first participant and the second participant to a plurality of destinations in response to determining that the emotion of the first participant is not the at least one particular emotion; and joining a recipient of the topic notification to the voice call in response to the topic notification.

30. The computer program product of claim 29 wherein the at least one topic is an approved topic identified on an approved topics list, and wherein the method further comprises detecting at least one second term in the voice signals, determining a second topic based on the at least one second term, determining that the second topic is a disapproved topic identified on a disapproved topics list, and not distributing a second topic notification of the second topic based on the determination that the second topic is a disapproved topic.

31. The computer program product of claim 29 wherein the method is iterative, and wherein a plurality of topic notifications is distributed during the duration of the voice call, and wherein each of the plurality of topic notifications is a topic notification about a different topic from a topic included in any other topic notifications.

32. The computer program product of claim 29 wherein a first of the plurality of topic notifications is distributed to a first destination of the plurality of destinations and not a second destination of the plurality of destinations, and a second of the plurality of topic notifications is distributed to the second destination and not the first destination.

33. A method for distributing topic notifications, comprising:

receiving, by a processing device, a first audio stream comprising voice signals generated by a first participant of a voice call speaking with a second participant during a duration of the voice call;

detecting, by the processing device, a plurality of terms in the voice signals;

determining, by the processing device, a plurality of topics based on the plurality of terms;

identifying a plurality of destinations based on user preference data associated with at least one of the first participant and the second participant;

generating a plurality of topic notifications based on the plurality of topics, wherein each topic notification identifies a different topic of the plurality of topics and at least one of the first participant and the second participant;

processing the first audio stream to identify an emotion of the first participant;

accessing the user preference data associated with the first participant, wherein the user preference data precludes topic notification distribution if at least one particular emotion is identified based on the first audio stream;

determining that the emotion is not the at least one particular emotion; and in response to determining that the emotion is not the at least one particular emotion, distributing the plurality of topic notifications to the plurality of destinations.

34. A method for distributing a topic notification, comprising:

receiving, by a processing device, a first audio stream comprising voice signals generated by a first participant in a voice call speaking with a second participant during a duration of the voice call;

detecting, by the processing device, at least one term in the voice signals;

determining, by the processing device, at least one topic based on the at least one term;

processing the first audio stream to identify an emotion of the first participant;

accessing user preference data associated with the first participant, wherein the user preference data precludes topic notification distribution if at least one particular emotion is identified based on the first audio stream;

determining that the emotion is not the at least one particular emotion; and in response to determining that the emotion is not the at least one particular emotion, distributing the topic notification including the at least one topic, an identification of at least one of the first participant and the second participant, and an identification of the emotion to a plurality of destinations.

35. A method for distributing a topic notification, comprising:

receiving, by a processing device, a first audio stream comprising voice signals generated by a first participant in a voice call speaking with a second participant during a duration of the voice call;

detecting, by the processing device, at least one term in the voice signals;

determining, by the processing device, at least one topic based on the at least one term;

accessing a distribution list identifying a telephone number of a mobile device;

processing the first audio stream to identify an emotion of the first participant;

accessing user preference data associated with the first participant, wherein the user preference data precludes topic notification distribution if at least one particular emotion is identified based on the first audio stream;

determining that the emotion is not the at least one particular emotion; and in response to determining that the emotion is not the at least one particular emotion, distributing the topic notification including the at least one topic and an identification of at least one of the first participant and the second participant via a short message service (SMS) message to the mobile device.

* * * * *